United States Patent
Rosa

Patent Number: 6,104,155
Date of Patent: Aug. 15, 2000

[54] CONTROLLED BRAKING DEVICE FOR ELECTRIC MOTORS AND IN PARTICULAR PORTABLE TOOLS

[75] Inventor: Carlo Rosa, Lecco, Italy

[73] Assignee: Black & Decker Inc., Newark, Del.

[21] Appl. No.: 08/970,432

[22] Filed: Nov. 14, 1997

Related U.S. Application Data

[63] Continuation of application No. 08/389,999, Feb. 17, 1995, abandoned, which is a continuation of application No. 08/263,172, Jun. 21, 1994, abandoned, which is a continuation of application No. 08/072,638, Jun. 4, 1993, abandoned.

[30] Foreign Application Priority Data

Jun. 5, 1992 [IT] Italy ................. MI92A1404

[51] Int. Cl.⁷ ............................................ H02P 3/12
[52] U.S. Cl. .................... 318/381; 318/380; 318/377; 318/245
[58] Field of Search ................... 318/244, 245, 318/362–382, 521–527, 268–273, 937

[56] References Cited

U.S. PATENT DOCUMENTS

| | | |
|---|---|---|
| 2,784,364 | 3/1957 | Gertin . |
| 2,799,818 | 7/1957 | Brown .................................. 318/245 |
| 3,331,004 | 7/1967 | Brown .................................. 318/245 |
| 3,548,276 | 12/1970 | Gross . |
| 3,731,149 | 5/1973 | Sherman et al. . |
| 3,866,098 | 2/1975 | Weiser ................................. 318/381 |
| 3,872,363 | 3/1975 | Gross . |
| 3,897,595 | 7/1975 | Fearno . |
| 4,166,240 | 8/1979 | Russell ................................ 318/380 |
| 4,243,919 | 1/1981 | Brown ................................. 318/269 |
| 4,250,436 | 2/1981 | Weissman ............................ 318/245 |
| 4,388,569 | 6/1983 | Shipaev et al. ......................... 318/87 |
| 4,393,344 | 7/1983 | Whellams ............................. 318/759 |
| 4,395,670 | 7/1983 | Podell ................................. 318/758 |
| 4,514,677 | 4/1985 | Kaufman, III et al. ................ 318/759 |
| 4,612,490 | 9/1986 | Kagi .................................. 318/761 |
| 4,754,211 | 6/1988 | Karjalainen ........................... 318/762 |
| 4,812,728 | 3/1989 | Yang .................................. 318/760 |
| 4,857,818 | 8/1989 | Hobbs ................................. 318/762 |

FOREIGN PATENT DOCUMENTS

| | | |
|---|---|---|
| 827263 | 4/1938 | France . |
| 2245796 | 4/1974 | France . |
| 2250835 | 4/1974 | Germany . |
| 2842145 | 4/1980 | Germany . |
| 3820629 | 12/1988 | Germany . |

*Primary Examiner*—David Martin
*Attorney, Agent, or Firm*—Dennis A. Dearing; John D. Del Ponti; Bruce S. Shapiro

[57] ABSTRACT

An electric motor (10,110,210) comprises a TRIAC (16, 116, 216) for controlling the application power to the motor and a switch (18,118,215a) for controlled cut-off of the power supply. Upon operation of a switch (15b, 115B, 215B) for short-circuiting of motor from a power supply (13, 14; 113,114; 213,214) armature the power is supported to the field windings (12,112,212) with at least one predetermined braking voltage. Upon exhaustion of a braking period, the switch mechanism operates to cut off power completely from the motor.

9 Claims, 3 Drawing Sheets

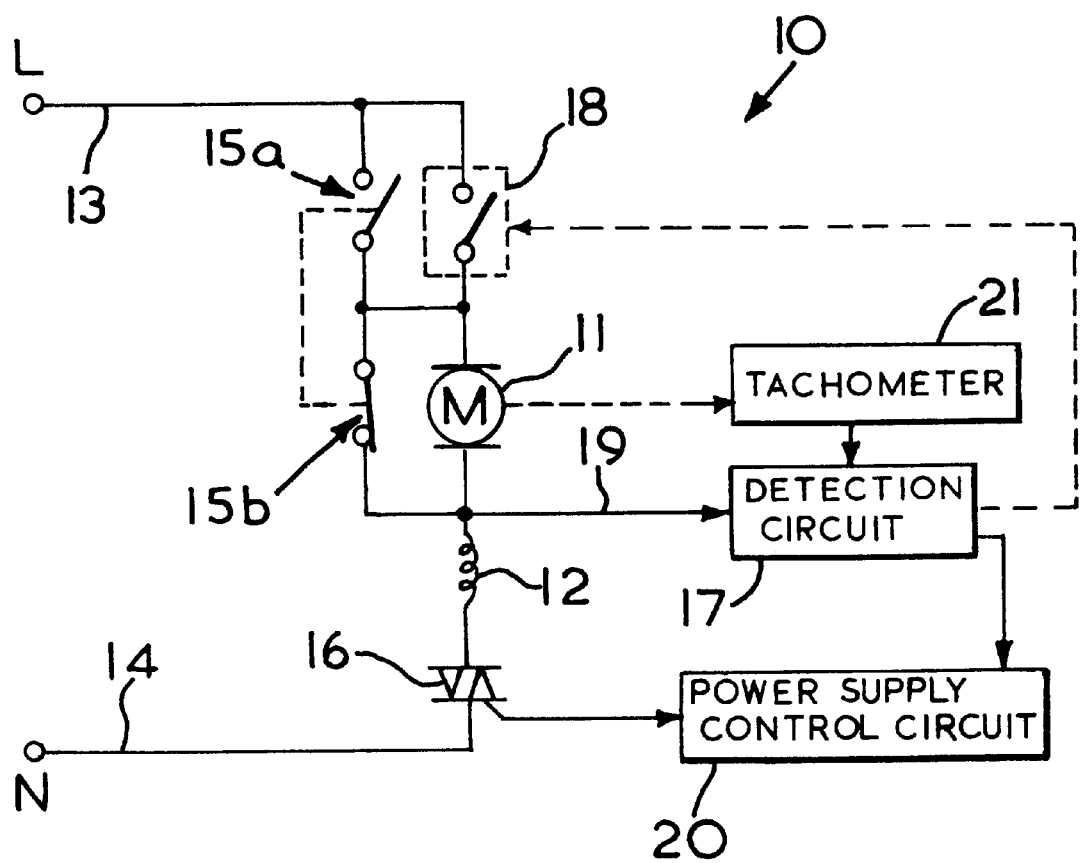

CONTROLLED BRAKING DEVICE FOR ELECTRIC MOTORS AND IN PARTICULAR PORTABLE TOOLS

This is a Continuation of application Ser. No. 08/389,999 filed Feb. 17, 1995, now abandoned, which is a continuation of application Ser. No. 08/263,172 filed Jun. 21, 1994, now abandoned, which is a continuation of application Ser. No. 08/072,638 field Jun. 4, 1993, now abandoned.

BACKGROUND OF THE INVENTION

This invention relates to electric motors, and particularly to series wound universal motors, and to tools incorporating such motors. In the known art of electric motors the problem of furnishing adequate braking of the motor upon its turning off is known. Continuing rotation by inertia is in fact a source of risk in various situations. In particular, it is desirable that portable electric tools, such as for example circular saws, grinders, etc., can be braked in a short time to allow the user to lay them down without excessive care soon after switching-off. In tools having universal motors supplied with alternating current, a braking system very widely used because of its economy is that of connecting in parallel the armature and field winding upon turning-off the tool. In this manner the counterelectromotive force generated produces a braking action on the rotor. Said system can however fail if the tool is turned off opposite a zero position of the supply current sinusoid. In this case the residual magnetic flux in the windings is nil and hence no braking force is generated. To obviate this shortcoming, various circuits have been proposed. For example, on switching-off, it has been proposed to power the motor with a direct current voltage for a brief fraction of time immediately before connection in parallel of the armature and field windings. This ensures the existence of a residual flux in the next parallel-connection phase. A circuit providing this feature is in DE-A-3820629.

Even after this elimination of the possibility of brake failure, there is another problem with both the braking techniques described above, and this is that the braking action can initially be very sharp, but then it decreases with the slowing of motor rotation. Thus the mechanical parts of the motor and, indeed, the tool in which it is fitted, are greatly stressed at the beginning of the braking process and this results in the possibility of mechanical failures. In addition, with manual tools the 'jerk' of the sudden braking can cause the tool to escape from the user's hand if not firmly gripped.

SUMMARY OF THE INVENTION

The general object of the present invention is to obviate the above mentioned shortcomings, or at least to mitigate their effects, by supplying a safe braking device for electric motors of the universal type, in particular for manual tools, which, while being economical, nevertheless ensures adequate braking upon switching-off the motor without initial 'jerks' and with a predetermined deceleration curve.

In accordance with the present invention, there is provided an electric motor comprising an armature, rotor coils on said armature, a stator, field coils on said stator, means to interconnect said rotor and field coils, switching means which has three modes: in a first of which said rotor and field coils are connected to a supply voltage; in a second of which said rotor coils are short circuited and a proportion of said supply voltage is connected to said field coils and in a third of which said supply voltage is disconnected from said field and rotor coils, and brake control means to control operation of said switch means from said second to third positions.

Preferably said proportion is between one tenth and one half of the supply voltage. Preferably voltage control means controls the voltage across said field coils and, in said first position of said switch means, a first voltage is applied to said field coils by said voltage control means, and in said second position of said switch means, a second smaller voltage is applied across said field coils by said voltage control means.

Preferably said voltage control means comprises a TRIAC in series with said field coils, under the control of a DIAC supplied by a first resistor/capacitor circuit having a second resistor in parallel with said first resistor wherein said second resistor is isolated from said bridge in said second position of said switch means. Said brake control means may comprise delay means to provide a predetermined delay period, of duration sufficient to ensure adequate braking of the motor. Alternatively, said brake control means may comprise means to detect rotation of the rotor and relay means to hold said switch means in said second position while said rotor rotates above a predetermined speed.

Said delay means may comprise a comparator which, after a predetermined delay detects said second voltage and deactivates said relay means so that said switch means moves to its third position. Said relay means may form an integral part of said switch means.

Thus the present invention not only ensures that a magnetic flux remains in the field windings during a braking period after switching-off the motor, but also provides for control of that magnetic flux in the most effective way to achieve optimum deceleration. What is more, much of the circuit employed for this purpose is already provided in many tools in the form of a motor speed control, which by a simple measure becomes a brake speed control. The invention provides for both a simple arrangement where the brake is simply applied for a predetermined delay period and a more sophisticated arrangement where motor speed controls the braking period. It is within the ambit of the present invention to provide more sophisticated arrangements providing variable braking characteristics.

BRIEF DESCRIPTION OF THE DRAWINGS

To further clarify the explanation of the innovative principles of the present invention and its advantages as compared with the known art there are described below with the aid of the annexed drawings possible embodiments as non-limiting examples applying said principles.

FIG. 5 shows an alternate embodiment of a motor power supply circuit of the present invention.

DETAILED DESCRIPTION OF PREFERRED EMBODIMENTS

Figure 1:
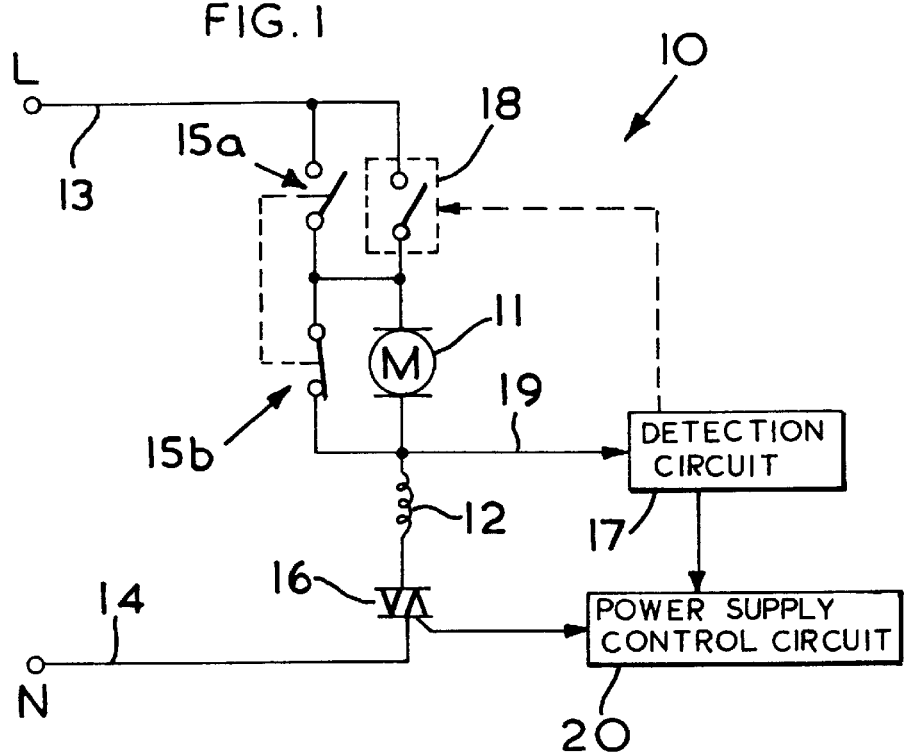
FIG. 1 shows a first diagrammatic motor power supply circuit provided in accordance with the preferred embodiment of the present invention.

With reference to the drawings, in accordance with the preferred embodiment, FIG. 1 shows a circuit 10 of a power supply for a universal type motor comprising an armature or rotor 11 and field windings 12 arranged in series with each other.

The motor is powered by an alternating current line 13,14 through a contact 15a of a main switch 15 and through a TRIAC 16. The main switch 15 comprises a second contact 15b in parallel with the rotor 11 and which closes when the contact 15a opens.

Figure 4:
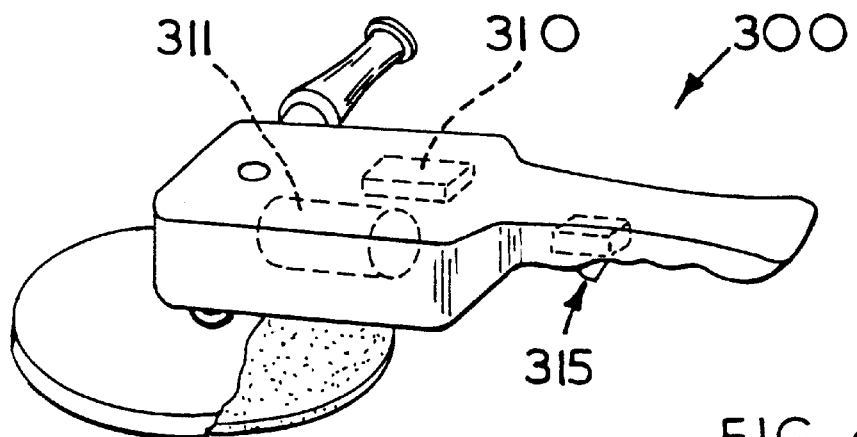

With reference to FIG. 4, the switch 15 is here operated by the trigger switch 315 controlling an angle grinder 300. The tool 300 has inside it a universal electric motor 311 comprising said windings 12 and armature 11. In this case opening of the contact 15a coincides with release of the trigger switch 315 by the operator. Inside the tool 300 there is a card 310 for assembly of the electronic and electric parts of the circuit 10.

The TRIAC 16 is connected with its terminal or command port to a power supply control circuit 20, which comprises a known voltage control system. A detection means, constituted by a circuit 17, controls both the circuit 20 and a relay 18, arranged in parallel with the contact 15a. The circuit 17 detects a warning signal upon release of the switch 15 through a line 19. The circuit 17 can for example be a microprocessor or wired logic system for control of the tool functions. The relay 18 and switch 15 comprise switching means operable in three modes for the circuit 10.

How this system may be constructed is substantially of the known art and therefore is not further illustrated nor described, it being readily imaginable to those skilled in the art, especially in the light of the following operation description.

In use, when the operator operates the switch 15, the contact 15a closes and the contact 15b opens. The foregoing operation of switch 15 constitutes the first mode of the switching means. The motor is thus normally powered, the TRIAC 16 being controlled by the circuit 20 to be for example operated in phase with the power supply 13,14; so comprising a known speed control. Simultaneously the circuit 17 commands closing of the relay 18, although closing the relay at this moment is superfluous, it being in parallel with the contact 15a already closed.

When the operator releases the switch 15 the contact 15a opens and the contact 15b short-circuits the armature 11. The foregoing release of switch 15 constitutes the second mode of switching means. The relay 18 however maintains the power supply, which now arrives directly at the windings 12 bypassing the armature 11. The voltage variation on the line 19 due to short-circuiting of the armature signals to the circuit 17 that the switch 15 has been released. The circuit 17 now controls through the circuit 20 and the TRIAC 16, powering of the windings 12 in accordance with any predetermined braking function. Said predetermined braking function can be merely a fixed voltage less than maximum operating voltage, or preferably a time variable voltage with predetermined behavior, but always some portion of the supply voltage. Thanks to the continuous powering of the windings 12 magnetic flow for operation of rotor braking is ensured. After a predetermined time period sufficient for complete braking, e.g. 2 seconds, the circuit 17 opens the relay 18, completely cutting off power to the tool. The foregoing operation of relay 18 constitutes the third mode of the switching means.

It is obvious that the circuit 17 can be provided to power the windings with a variable voltage in accordance with any predetermined function so as to achieve desired deceleration and braking. The circuit 17 can of course merely reduce the power supply voltage of the motor to a fixed value, e.g. corresponding to one tenth of normal motor power supply, predetermined to avoid excessively sharp initial braking. Indeed, a diode and resistor could be incorporated in series with the relay 18 so that a direct current voltage powers the windings 12 during the braking period.

Figure 2:
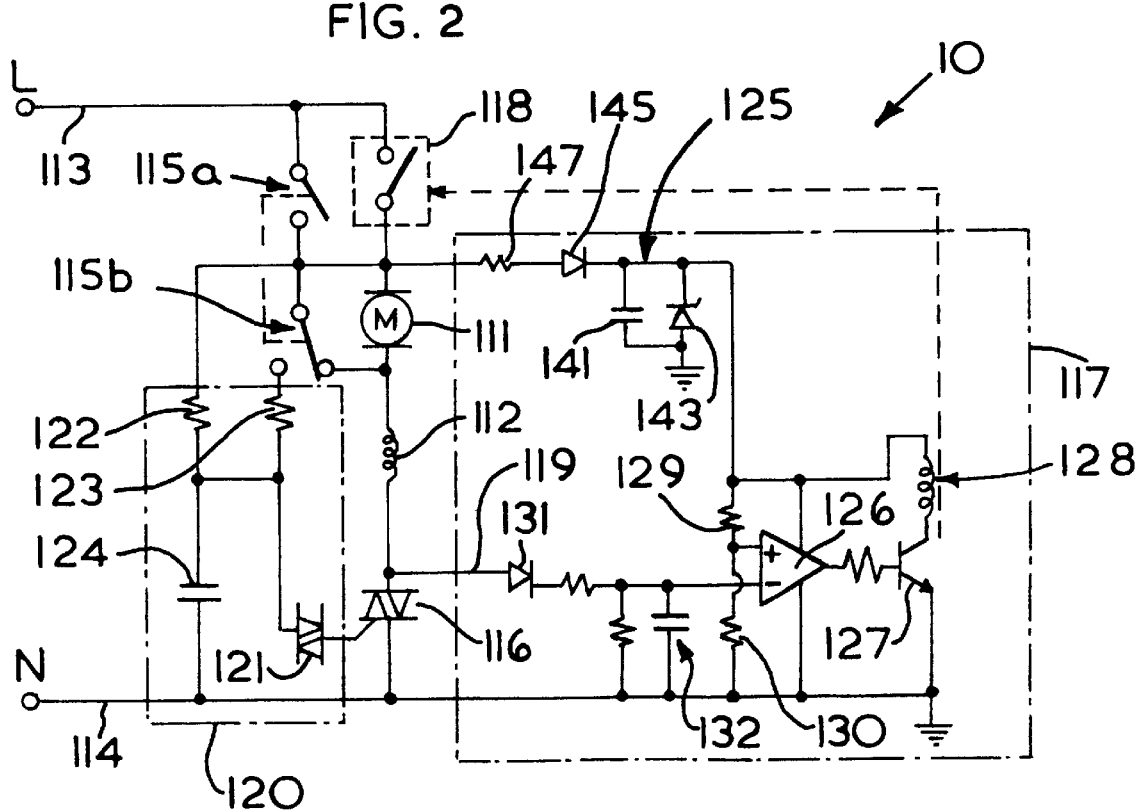
FIG. 2 shows a circuit embodying some of the principles of the circuit of FIG. 1.

FIG. 2 shows a second possible embodiment of a circuit indicated generally by reference number 110 putting into practice some of the features described above with reference to FIG. 1. More specifically, FIG. 2 shows the preferred detailed schematics for constructing power supply control circuit 20 and detection circuit 17. In FIG. 2, circuit 120 and circuit 117 correspond, respectively, to circuit 20 and circuit 17 in FIG. 1. A universal type motor comprises an armature or rotor 111 and field windings 112 arranged in series.

The motor is powered by an alternating current line 113,114 through a contact 115a of a main switch 115 and through a TRIAC 116. The main switch 115, e.g. provided again in trigger form for the tool, comprises a second exchange contact 115b which closes in short circuit the rotor 111 when the contact 115a opens.

The TRIAC 116 is controlled by a control circuit 120 formed of a DIAC 121 connected to an RC network to provide a known phase-displacement voltage control system. The RC network comprises a condenser 124 and a first resistor 122. The exchange contact 115b, when in the position opposite the rotor short-circuit position, connects a second resistor 123 to the RC network in parallel first resistor 122.

A detection circuit 117 has an input 119 connected between the field winding 112 and the TRIAC 116. It has a control output for a relay 118 which is arranged parallel the contact 115a. The circuit 117 further comprises a power supply section 125 supplying a comparator 126 in the form of an operational amplifier controlling through a transistor 127 a coil 128 for closing the relay 118. Section 125 comprises parallel connected capacitor 141 and zener diode 143 connected to the output of diode 145 and resistor 147.

The comparator 126 has a reference input (+) connected to a reference generator comprising a resistive divider 129,130. A comparison input (−) of the comparator 126 is connected to the input 119 of the circuit 117 through a rectifying diode 131 and an integration RC network 132.

During operation there is on the network condenser 132 (and hence at the comparison input (−) of the comparator 126) a voltage inversely proportional to the average value of the positive half-wave of the motor power supply. This voltage is compared with the reference given by the divider 129,130.

In use, upon operating the switch 115 the motor is normally powered through it and through the TRIAC 116, controlled by the circuit 120. Here the voltage on the condenser 132 is low enough to be less than the reference voltage, and hence the comparator will hold the relay 128,118 attracted and its contacts closed.

Releasing the switch 115, the contact 115b short-circuits the rotor 111 and disconnects simultaneously the resistance 123 from the circuit 120. The contact 115b thus reduces the motor power supply to a value established by the resistance 122, and which is predetermined to offer the optimal braking effect. The power supply of the circuit is ensured by the relay 118, which is still closed.

However because the conduction periods of the TRIAC have diminished, by disconnecting resistor 123, the voltage on line 119 increases. The absolute point at which the threshold determined by the reference input (+) is reached depends on the time constant determined by the values of the RC network 132 and division of resistors 129,130. When the input voltage (−) of the comparator becomes greater than the reference voltage (+), the comparator de-energizes the relay 128,118 and finally completely removes circuit power supply.

Figure 3:
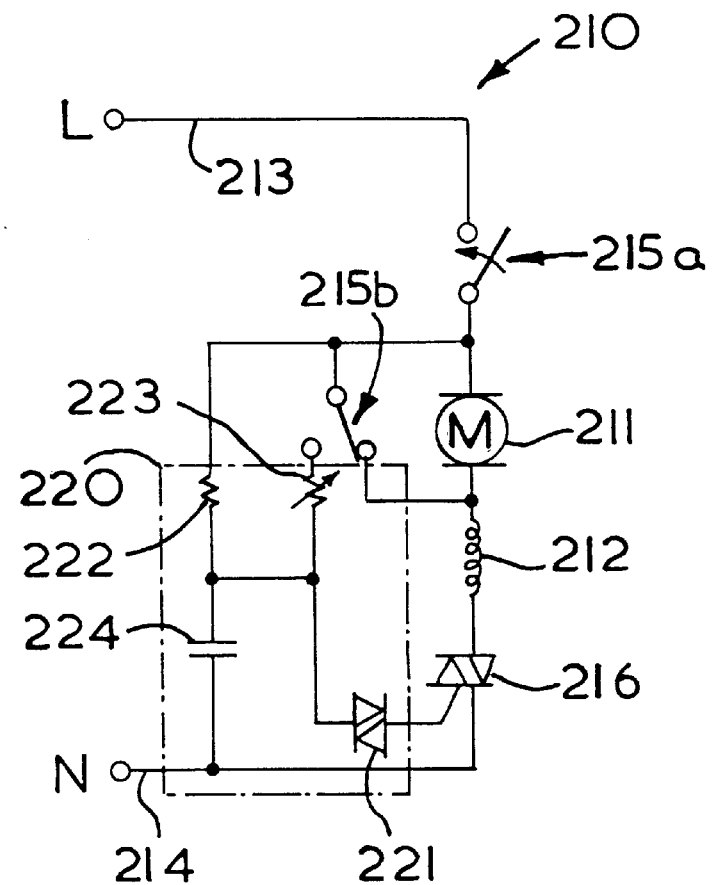
FIG. 3 shows an alternative motor power supply circuit provided in accordance with the present invention; and, FIG. 4 shows diagrammatically a portable tool adapted to incorporate the circuit of FIGS. 1 and 5.

FIG. 3 shows an alternative nonpreferred circuit 210 for power supply and braking of an electric motor formed of an armature 211 and field windings 212. The series circuit between the armature 211 and field windings 212 is powered by an electric line 213,214 through a contact 215*a* of a main switch 215 and through a TRIAC 216. The main switch 215, provided for example again in a tool trigger, comprises also a second exchange contact 215*b* which closes when the contact 215*a* is opened and short circuits the armature 211.

The TRIAC 216 is controlled by a control circuit 220 formed of a DIAC 221 connected to an RC network to provide a known phase-displacement voltage control system as described with reference to FIG. 2. The RC network comprises a condenser 224 and a first resistor 222 to which the exchange contact 215*b*, when in a position opposite that of armature short circuit, connects a second resistor 223. The resistor 223 can advantageously be variable so as to enable control of the rotation speed of the motor during its normal operation.

The contact 215*a* is a delayed contact, i.e. upon release of the switch 215 it opens with a predetermined delay equal to the requisite time for braking.

In use, by operating the switch 215 the contact 215*a* closes instantaneously and the exchange contact 215*b* moves from the position shown in the figure to connect the resistor 223 to the RC network of the control circuit 220. The motor then begins to turn at the speed preset by the condenser 224 and the parallel result of the resistors 222, 223.

Upon release of the switch 215 the contact 215*b* returns instantaneously to the original position, short-circuiting the rotor 211 and disconnecting the resistor 223. The power supply is thus reduced to the value established by the resistor 222 alone. There is then a braking phase until delayed opening of the contact 215*a*.

FIG. 5 shows another alternate embodiment of the present invention that is identical to the embodiment of FIG. 1 except that the braking (delay) period is controlled by motor speed rather than a predetermined braking (delay) period. corresponding components in FIGS. 5 and 1 are identically enumerated. A variable delay period is functionally superior to a fixed delay period but is not preferred because it is more difficult and more expensive to implement.

In FIG. 5, the speed of rotor 11 is detected by a tachometer 21 connected to the armature shaft and may constituted, for example, by a magnetic ring on the shaft and a Hall effect transistor or a coil. The output of tachometer 21 is fed to delay circuit 17 which monitors rotor speed and generates a signal to operate relay 18. Delay circuit 17 can be a suitably programmed microcomputer such as Mitsubishi M37410. In the embodiment of FIG. 5, the brake control means thus comprises means (tachometer 21) to detect rotation of the rotor 11 and relay means (circuit 17 and relay 18) to hold switch means 15 in the second position while rotor 11 rotates above a predetermined speed. The embodiment of FIG. 5 operates otherwise identically to the embodiment of FIG. 1.

At this point it is clear that the preset objects of supplying an economical power supply circuit allowing controlled braking without initial jerks of a universal electric motor have been achieved.

Naturally, the above description of embodiments applying the innovative principles of the present invention is given merely by way of example and therefore is not to be taken as a limitation of the scope of the invention.

For example, the switch means, in addition to relay contacts 18,118, can be provided by electronic components, as for example by a TRIAC. In addition, the contact 15*a*, 115*a*, instead of powering the motor directly, can merely command the control circuit 17, 117 to close the relay 18,118.

I claim:

1. An electric motor comprising:

an armature;

a field coil;

means to interconnect the armature and the field coil;

a switching means (i) operable in a first mode for connecting the armature and the field coils to a first supply voltage to drive the armature, (ii) operable in a second mode for short circuiting the armature, connecting a second voltage less than the first supply voltage to the field coils and thereby braking the motor, and (iii) operable in a third mode for disconnecting the first supply voltage from the armature and the field coils;

means operating continuously in a consistent monitoring mode during at least the second mode independently of the operational condition of the motor during the first mode and the second mode for determining when a voltage in circuit with the field coil reaches a prescribed threshold voltage level;

brake control means responsive to the voltage in circuit with the field coil reaching the prescribed threshold voltage level for controlling operating of the switching means to change the switching means from the second to the third mode; and a variable voltage control means for controlling the magnitude of the voltage across the field coils so that (i) in the first mode of the switching means, the first supply voltage is applied to the field coils by the voltage control means and (ii) in the second mode of the switching means, the second smaller voltage is applied to the field coils by the voltage control means.

2. A motor according to claim 1, wherein said second voltage is between one tenth and one half of the first supply voltage.

3. A motor according to claim 1, wherein (a) said variable voltage control means comprises a TRIAC in series with said field coils, and a DIAC connected to a first resistor/capacitor circuit having a second resistor in parallel with said first resistor, and (b) said second resistor is disconnected from said circuit in said second mode of said switch means.

4. A motor according to claim 1, wherein the switching means comprises:

a relay means for connecting the first supply voltage to the field coils in the second mode; and a comparator which is connected to the relay means and, after the prescribed threshold voltage level is reached, detects said threshold voltage and deactivates said relay means so that said switch means moves to its third mode.

5. A motor according to claim 1, wherein the means for determining when a voltage in circuit with the field coil reaches the prescribed threshold voltage level comprises:

a comparator for comparing during the first mode a representative voltage appearing across a resistance device in a circuit including the armature and the field coils with a reference voltage referenced to the first supply voltage.

6. A motor according to claim 5, further comprising an impedance device across which a comparison voltage is developed indicative of the representative voltage for application to a comparison input of the comparator.

7. A motor according to claim 6, wherein the first voltage is an AC voltage and wherein the representative voltage is a voltage inversely proportional to the average value of the positive half-wave of the first voltage.

8. A motor according to claim 5, further comprising a switching element coupled to an output of the comparator for controlling operation of the switching means to terminate the second mode.

9. A motor according to claim 5, further comprising a resistance-capacitance network coupled to the comparison input of the comparator for establishing the prescribed period.

* * * * *